May 11, 1965 K. J. BRAUN 3,182,992

APPARATUS FOR HANDLING RECORD CARDS

Filed June 21, 1960 11 Sheets-Sheet 1

Inventor:
Karl J. Braun
By his Attorney
Vincent A. White

May 11, 1965 K. J. BRAUN 3,182,992

APPARATUS FOR HANDLING RECORD CARDS

Filed June 21, 1960 11 Sheets-Sheet 3

May 11, 1965 K. J. BRAUN 3,182,992

APPARATUS FOR HANDLING RECORD CARDS

Filed June 21, 1960 11 Sheets-Sheet 4

APPARATUS FOR HANDLING RECORD CARDS

Filed June 21, 1960 11 Sheets-Sheet 9

United States Patent Office 3,182,992
Patented May 11, 1965

3,182,992
APPARATUS FOR HANDLING RECORD CARDS
Karl J. Braun, Springdale, Conn., assignor to Kimball Systems, Inc., a corporation of New York
Filed June 21, 1960, Ser. No. 37,680
5 Claims. (Cl. 271—3)

This invention relates to machines for processing statistical records. More particularly, the invention is directed to the combination of means for feeding and accurately registering records with a novel record sensing means.

As is well known in the art, a large number of statistical records are in the form of cards each having a well-defined and accuractely dimensional outline. Each card is usually provided with a pattern of index point positions which may be punched or otherwise marked to encode information on the card. The pattern on the card normally is accurately oriented with respect to the edges of the card so that the coded information can later be sensed using the card edges as reference points.

There is a wide variety of mechanisms which are adapted to feed individual records of this type to means for processing the record. Such means may act on a blank record for encoding information thereon by punching or otherwise marking the record at the index point positions or may act on a previously marked record for reading the encoded information. In either case, it is essential that the field of index point positions be registered accurately with the means acting on the record. The most common record feeding mechanism includes a series of driven rolls engaging spaced portions of the record. This type of feed is satisfactory to maintain accurate orientation of the record as it is fed if the record is initially fed to the bite of the rolls in perfect orientation and if all rolls engaging the different portions of the record are under equal pressure. Thus if all roll conditions are not perfect the record will be skewed to some extent and cannot be precisely registered with means to act on the record. Other types of feed mechanisms have similar shortcomings, with the result that many record processing machines are provided with complex aligning and registering means separate from the feeding means.

Accordingly, it is a principal object of the invention to provide a simple record feeding mechanism which overcomes the above objections without undue complexity and without separate registering means being required. To this end a novel feed mechanism is provided which includes grippers engaging individual records at opposite marginal portions when the record is accurately oriented at a predetermined position. The grippers are adapted to move a predetermined distance while maintaining the orientation of the record for feeding the record into accurate registration with means to act on the record in positions oriented with respect to its edges. A further related feature of the invention provides a series of spaced sets of grippers mounted for unitary movements for feeding a succession of individual records to a series of stations which perform successive operations on each record.

Another principal object of the invention recognizes the fact that previously marked records may not have the pattern of marks or perforations accurately oriented with respect to the record edges. When such records are registered by reference to their edges with means for sensing the index positions, quite often the perforations cannot be sensed with the usual type of sensing means. For the purpose in view the present invention provides sensing means which allows considerable misregistration without affecting the accuracy of sensing. To this end, the sensing means includes at least two pins projectable into engagement with each index position on a record. Either pin is individually effective to sense a perforation by passing through any part thereof. This allows considerable misregistration between the area encompassed by the two pins and the associated perforation area of the record.

The above and other objects and features of the invention, including various novel details of construction and combinations of parts, will now be more particularly described with reference to the accompanying drawings and thereafter pointed out in the claims.

Figure 1:
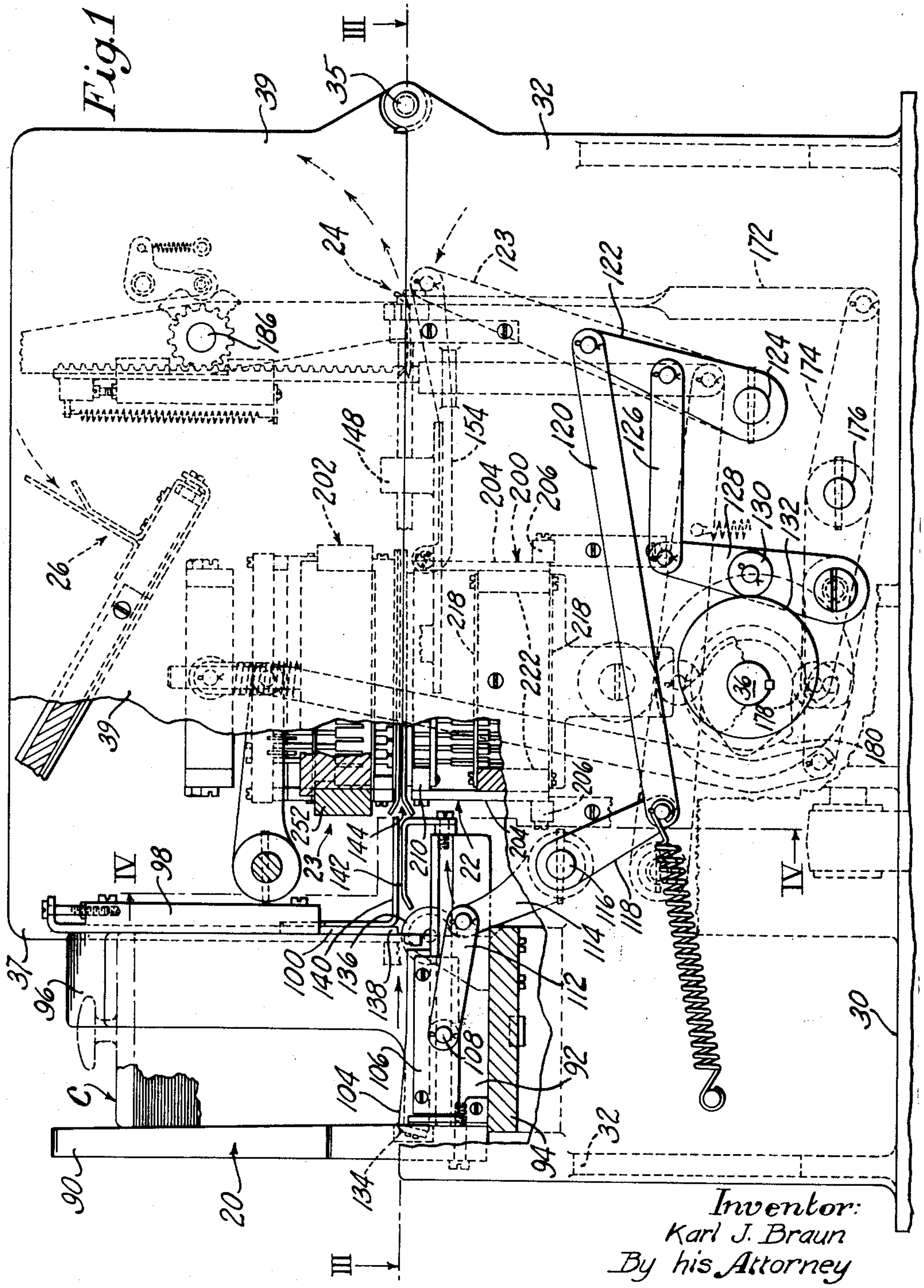
FIG. 1 is a side elevation of a machine embodying the present invention.
Figure 2:
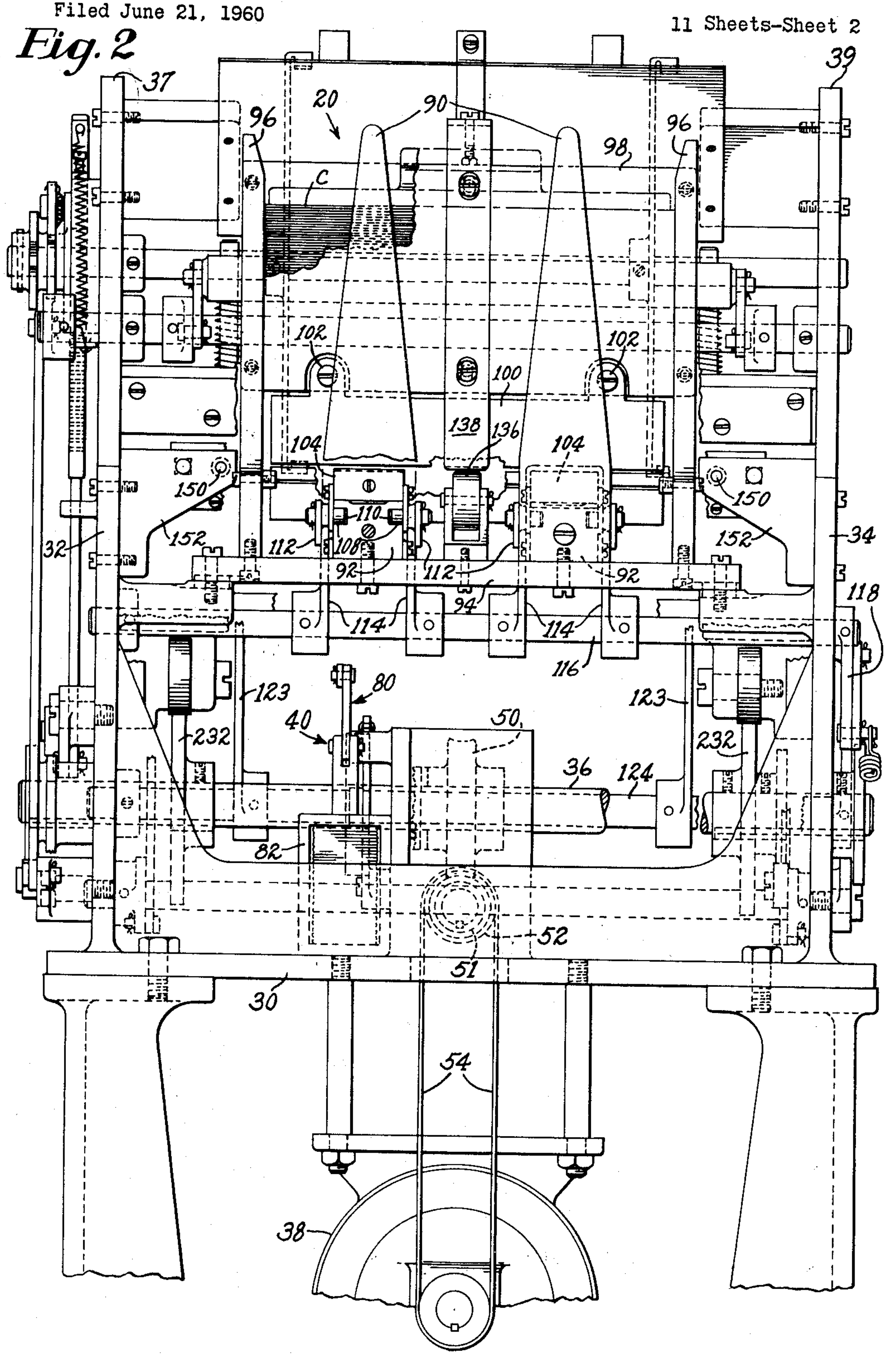
FIG. 2 is an end elevation of the machine.

The machine includes a feed magazine 20 (FIG. 1) for holding a stack of tabulating cards C, a sensing station 22 to which individual cards are fed for sensing, a unit 23 which stores the information sensed and a stacking unit 24 for depositing the sensed cards in a receiving magazine 26. Referring to FIGS. 1 and 2, it may be seen that these mechanisms are supported by a lower frame which includes a base 30 having two spaced parallel side frames 32 and 34 and by an upper frame pivotally connected to the lower frame by pins 35 and which includes two side frames 37 and 39.

Figures 7, 8:
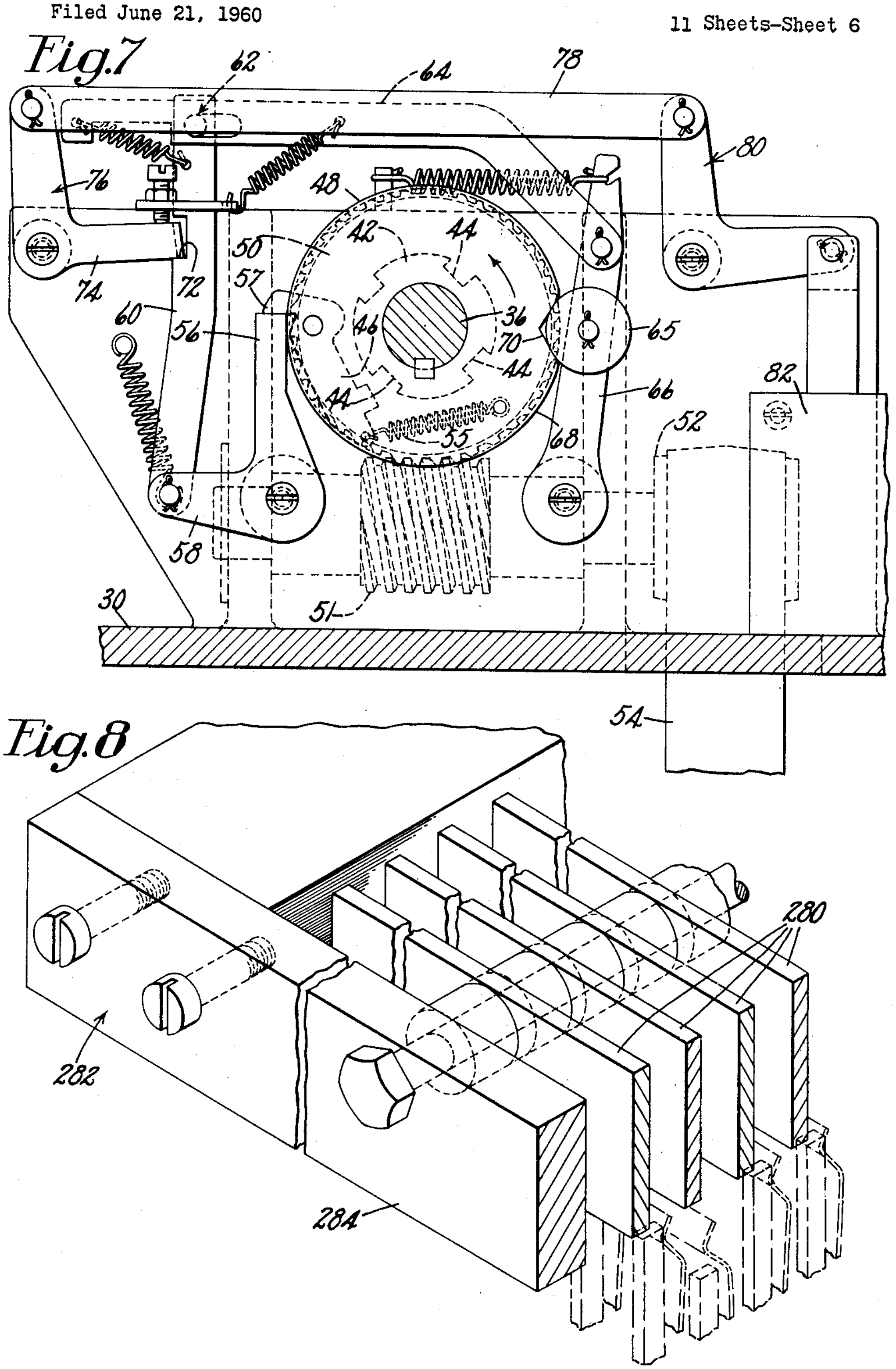
FIG. 7 is a section along line VII—VII of FIG. 4.
FIG. 8 is a perspective view of a portion of the storage clearing unit.

The various mechanisms of the machine are operated by cams mounted on a cam shaft 36 journaled at opposite ends in the side frames 32, 34. The shaft is driven from a motor 38 (FIG. 2) through a single revolution clutch 40. The clutch (shown most clearly in FIG. 7) includes a driving flange 42 having notches 44 adapted to receive one end of a clutch pawl 46 pivotally mounted on a driven flange 48 keyed to the cam shaft. The driving flange 42 and a worm wheel 50 to which it is fixed are mounted for rotation on the shaft 36. The worm wheel 50 (see also FIG. 2) is continuously driven by a worm 51 having a pulley 52 connected to the motor by a belt 54. The clutch pawl 46 is urged toward engagement with the driving flange by a spring 55 but is normally held out of engagement, as illustrated in FIG. 7, by a latch 56 which engages a tailpiece 57 on the pawl. The latch is provided with an arm 58 carrying an upstanding link 60 connected by a pin and slot connection 62 to one end of a cross link 64. The opposite end of the cross link is connected to the upper end of a cam lever 66 having a roll 65 riding on the periphery of the driven flange 48. The flange has a V-shaped depression 70 adapted to receive the roll when the shaft 36 is at rest and in the position illustrated in FIG. 7. The link 60 is provided with a shoulder 72 which is engaged by an arm 74 of a bell crank 76. The other arm of the bell crank is connected by a link 78 to one arm of another bell crank 80, the other arm of which is connected to the armature of a solenoid 82.

To operate the clutch the solenoid 82 is energized, moving its armature down rocking the bell cranks 80 and 76 in clockwise directions. This causes the arm 74 to move the link 60 down rocking the latch 56 to the left, releasing the tailpiece 57 of the clutch pawl which then moves into engagement with one of the notches 44 in the rotating driving flange 42. In this manner the flanges 42 and 48 are connected, causing the cam shaft 36 to rotate. As soon as the driven flange 48 commences rotation, the roll 65 rides out of the depression 70, moving the cam lever 66 and hence also the link 60 to the right and disengaging the shoulder 72 on the link from the arm 74. This allows the link 60 to rise and the latch 56 to return to its initial position in the path of movement of the tailpiece of the clutch pawl 46. Thus, upon completion of one revolution of the cam shaft, the tailpiece of the pawl strikes the latch 56 to disengage the pawl from the driving flange 42. Also at this time, the cam roll 65 enters the depression 70 to stop the cam shaft in its initial or zero position.

The feed magazine 20 (FIGS. 1–3) includes two upright bars 90 secured near their lower ends to a pair of guide blocks 92 on a horizontal plate 94 fixed at opposite ends to the side frames 32, 34. The bars 90 form the rear wall of the magazine while two bars 96 also fixed to the plate 94 form the side walls. The upper portion of the front wall of the magazine is formed by a vertical plate 98, carried by the bars 96, the lower portion of the front wall being formed by another plate 100 secured to the lower end of the plate 98 by screws 102. The plates 98, 100 and the bars 90, 96 are suitably spaced to accommodate a stack of cards C, maintaining each card in the stack in an accurately oriented condition with respect to card handling means which accurately maintains the oriented condition, as will be described. The bottom card in the stack rests on two spaced slides 104 adapted to reciprocate on the guide blocks 92 and having side plates 106 (FIG. 3) slidably engaging opposite sides of the guide blocks. Each side plate 106 is provided with pins 108 which extend into grooves 110 in the guide blocks to retain the slides 104. The pins 108 also are utilized to connect the slides through links 112 to arms 114 fixed to a shaft 116 journaled in the side frames 32, 34. The shaft extends through the side frame 34 and also has fixed thereto a depending arm 118 connected through a link 120 to the upper end of an arm 122. The arm 122 is fixed on a shaft 124 journaled in the side frames and also has fixed thereto a pair of arms 123 inside the frames. Intermediate its ends the arm 122 is connected by a link 126 to a cam lever 128 having a roll 130 riding on the periphery of a cam 132 on the cam shaft.

Each slide 104 is provided with a lip formed by an adjustable plate 134 projecting above the surface of the slide sufficiently to engage the edge of the lowermost card oriented in the magazine. During a machine cycle, the above-described mechanism moves the slides 104 forwardly or to the right from the position seen in FIG. 1 to a predetermined position seen in FIGS. 5 and 6. During this movement the lips on the slides engage the bottom card separating it from its position oriented with the stack and moving its leading edge through an opening formed between a roll 136 and the lower end of an adjustable throat plate 138 on the plates 98, 100, and between two guide plates 140, 142 to the predetermined position seen in FIGS. 5 and 6.

Figure 3:
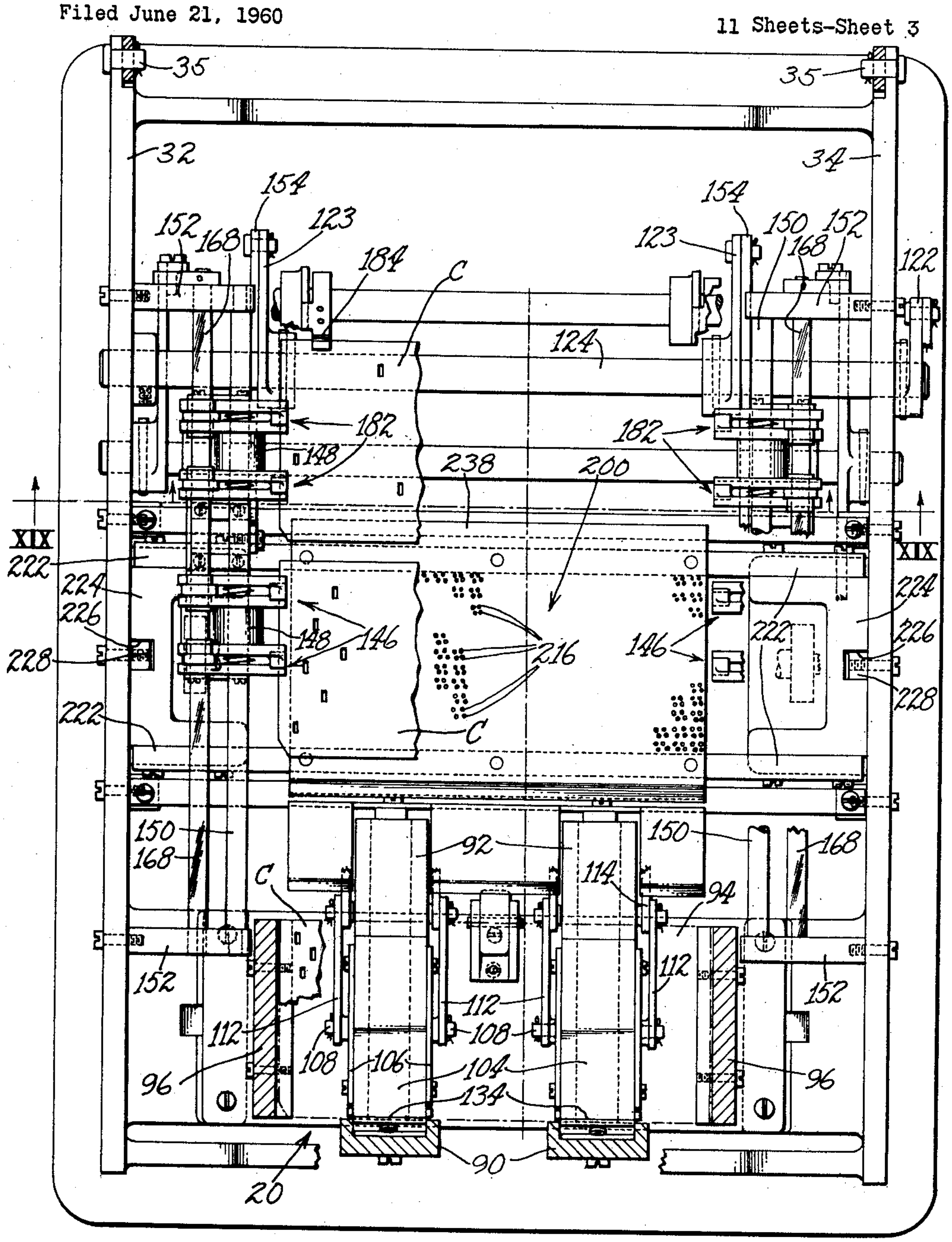
FIG. 3 is a section substantially along line III—III of FIG. 1.
Figure 4:
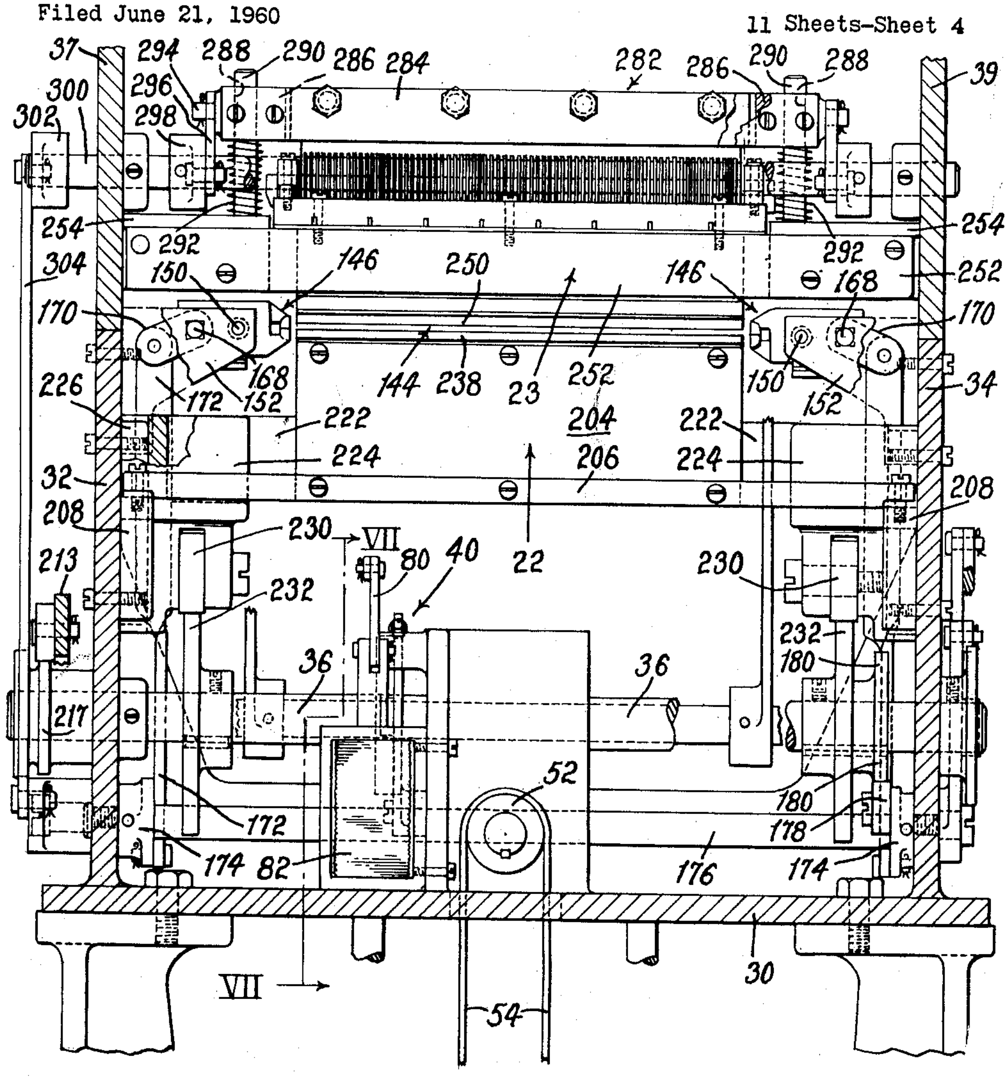
FIG. 4 is a section along line IV—IV of FIG. 1.
Figure 5:
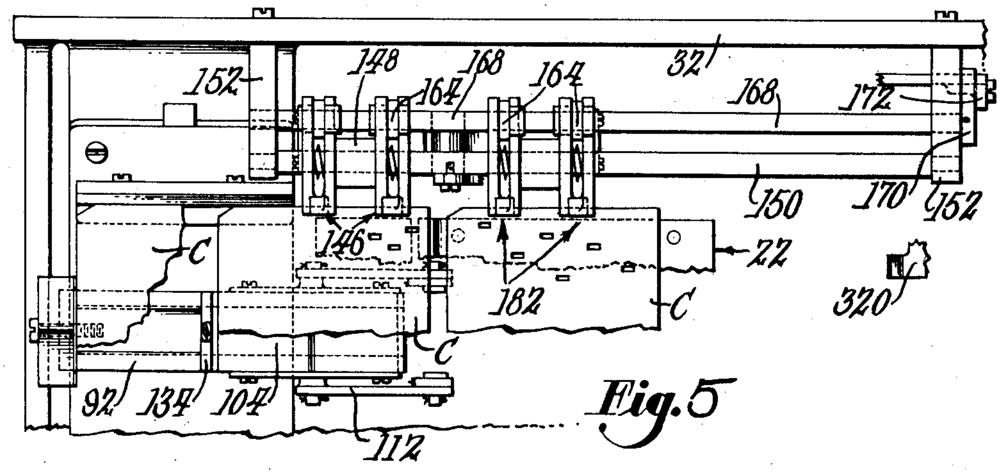
FIG. 5 is a plan view of a portion of the machine as seen in FIG. 3.
Figure 6:
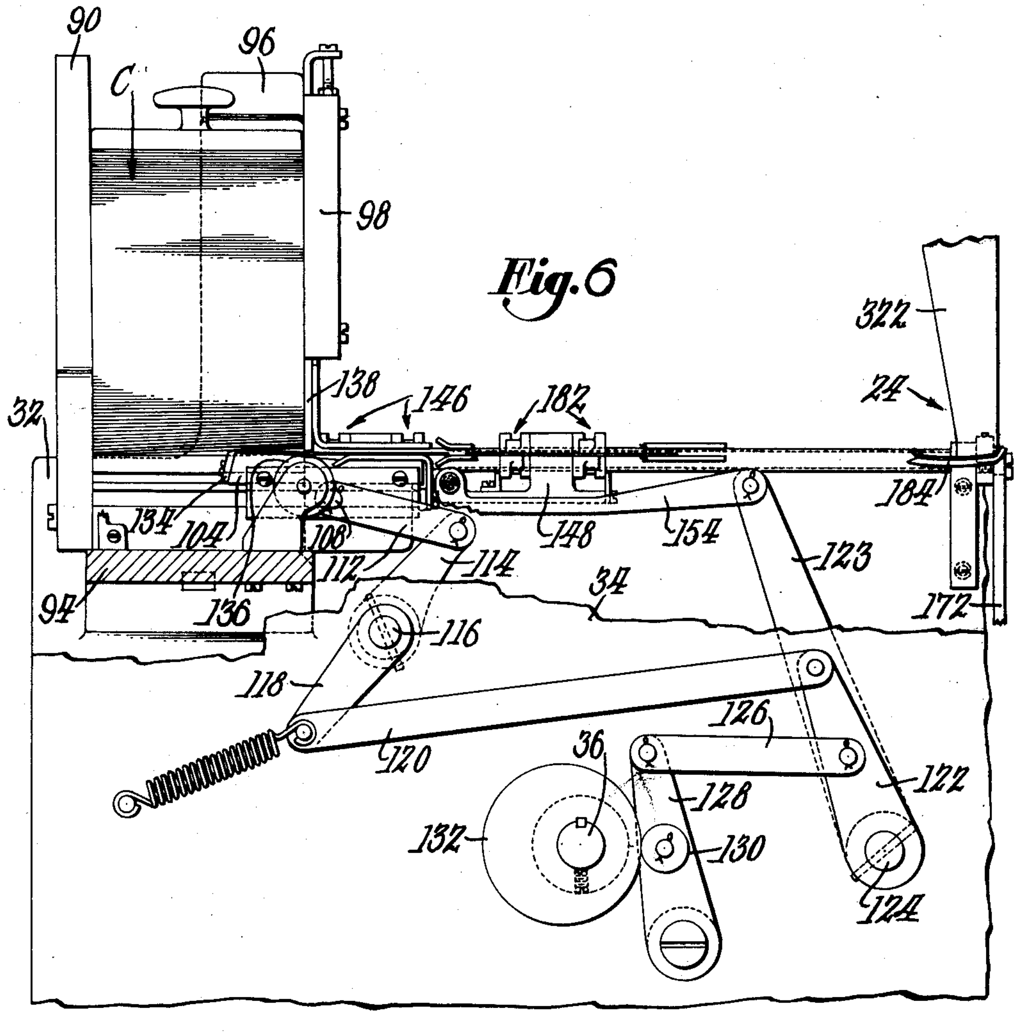
FIG. 6 is a side elevation of the mechanism illustrated in FIG. 5.
Figure 19:
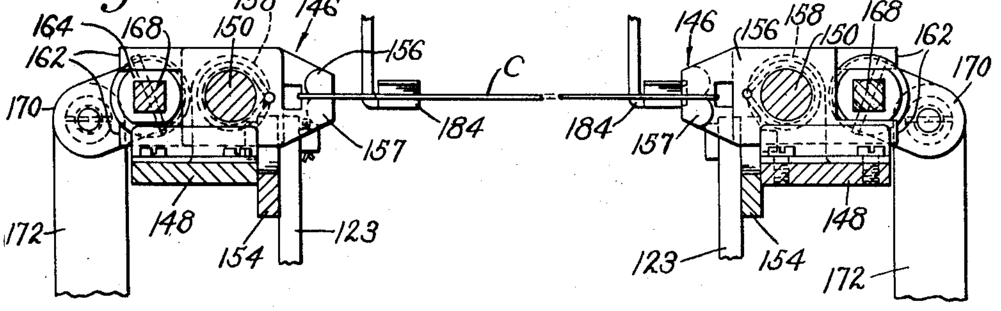
FIG. 19 is a section on line XIX—XIX of FIG. 3.

For feeding the card from the accurately oriented position shown in FIGS. 5 and 6 and into registered position in the card chamber 144, the machine is provided with card grippers 146 at opposite sides of the machine. During a machine cycle the grippers are moved from the positions seen in FIG. 3 to the positions seen in FIGS. 5 and 6 where the grippers engage the card in the predetermined position to which is simultaneously is moved from the magazine by the slides 104. As will be described, the grippers are open at this time so that the card is fed in oriented condition by the slides 104 into registration with the open jaws of the grippers 146. The grippers are arranged to grip opposite edges of the card registered therewith, as seen in FIGS. 3 and 5, and are mounted on carriers 148 arranged to slide along rods 150 (see also FIGS. 3, 4 and 19). The rods are carried at opposite ends in brackets 152 which extend inwardly from the side frames. Each carrier 148 is connected by a link 154 (FIGS. 1 and 6) to one of the arms 123. From a comparison of FIGS. 1 and 6, it should be obvious that when the slides 104 are moved to the right to feed a card from the magazine, the cam 132 acting through the arm 122, shaft 124, arms 123 and the links 154 causes the gripper carriers 148 to be moved to the left to meet the card fed from the magazine.

Each set of grippers includes a pair of opposed gripper members 156, 157 (FIGS. 18 and 19) pivotally mounted on the rod 150 and urged into closed position by a torsion spring 158. The gripper members are provided with tailpieces 162 which engage opposed flats of cam pieces 164, slidably mounted on a square rod 168 also journalled at opposite ends in the brackets 152. Each of the square rods 168 has fixed thereto at one end an arm 170 connected by a link 172 to one arm of a cam lever 174 fixed to a shaft 176 (FIGS. 1, 3 and 4) extending across the machine and journaled in the side frames 32, 34. The other end of the cam lever is provided with a roll 178 which rides on the periphery of a cam 180. Just prior to the above-described movement of the gripper carrier to the left a rise on the cam 180 rocks the cam lever 174 in a counterclockwise direction, as seen in FIG. 1, raising the links 172 and rocking the arms 170 and the square shafts 168. When the shafts 168 are rocked, the cam pieces 164 are also rocked until the circular portions of the cam pieces engage the tailpiece 162 of the grippers, moving the tailpieces apart and causing the gripper members 156, 157 to open against the action of the torsion springs 158. The grippers are thus held in their open position during the entire movement of the gripper carriers to the left so that the card is fed by the slides 104 into the open grippers to the position shown in FIGS. 5 and 6. Immediately after the gripper carriers have completed their leftward movement into registration with the card in its above-mentioned predetermined position, the cam lever 174 is rocked back to its initial position allowing the square shaft 168 to return to its initial position, also allowing the torsion springs 158 to close the grippers on the card. As the clutch completes it cycle of operation, the grippers remain closed on the oriented card registered therewith while the gripper carriers are moved to the right through the action of the cam 132 to feed the card into the card chamber 144 of the sensing unit 22, as seen in FIG. 3.

From the above it will be seen that as each card is fed from the magazine 20, it is firmly held by its edge portions: first by lips on the slides 104 engaging its rear edge and moving the card a precise distance to a predetermined position and thereafter by grippers which firmly maintain the orientation of the card by gripping its edge portions as they move the card a predetermined distance to the sensing unit 22. In the above manner, each card is individually fed to the sensing unit where it is accurately registered by reference to its edges with means for acting on the registered card. In the present embodiment such means comprise a plurality of pins for sensing perforations in the card as will subsequently appear. In a machine cycle, the sensing pins engage the card just before the grippers are opened and moved to their leftmost position, as previously described, where they are closed on another record fed from the magazine.

Referring to FIGS. 3 and 5, it may be seen that the machine is provided with another set of grippers 182 identical with the grippers 146 and mounted on the same carriers 148 for unitary movements therewith. Referring to FIG. 5, it may be seen that when the grippers 146 are in position to accept another card fed from the magazine, the grippers 182 are in position to engage the card previously fed to the sensing unit. Thus, when the grippers 146 feed another card to the sensing unit, the grippers 182 simultaneously feed a card in the same direction and distance from the sensing unit into a pair of spring clips 184 of the card stacking unit 24. It should be apparent that the grippers 182 could be used to register the sensed card with another unit acting on the card, such as another sensing operation or, for example, for punching additional information in the card. Without substantial modification, except for adding other sets of grippers, the above-described card handling mechanism could be utilized to register with extreme accuracy a succession of individual cards with any number of successive card processing units.

Figures 20, 21:
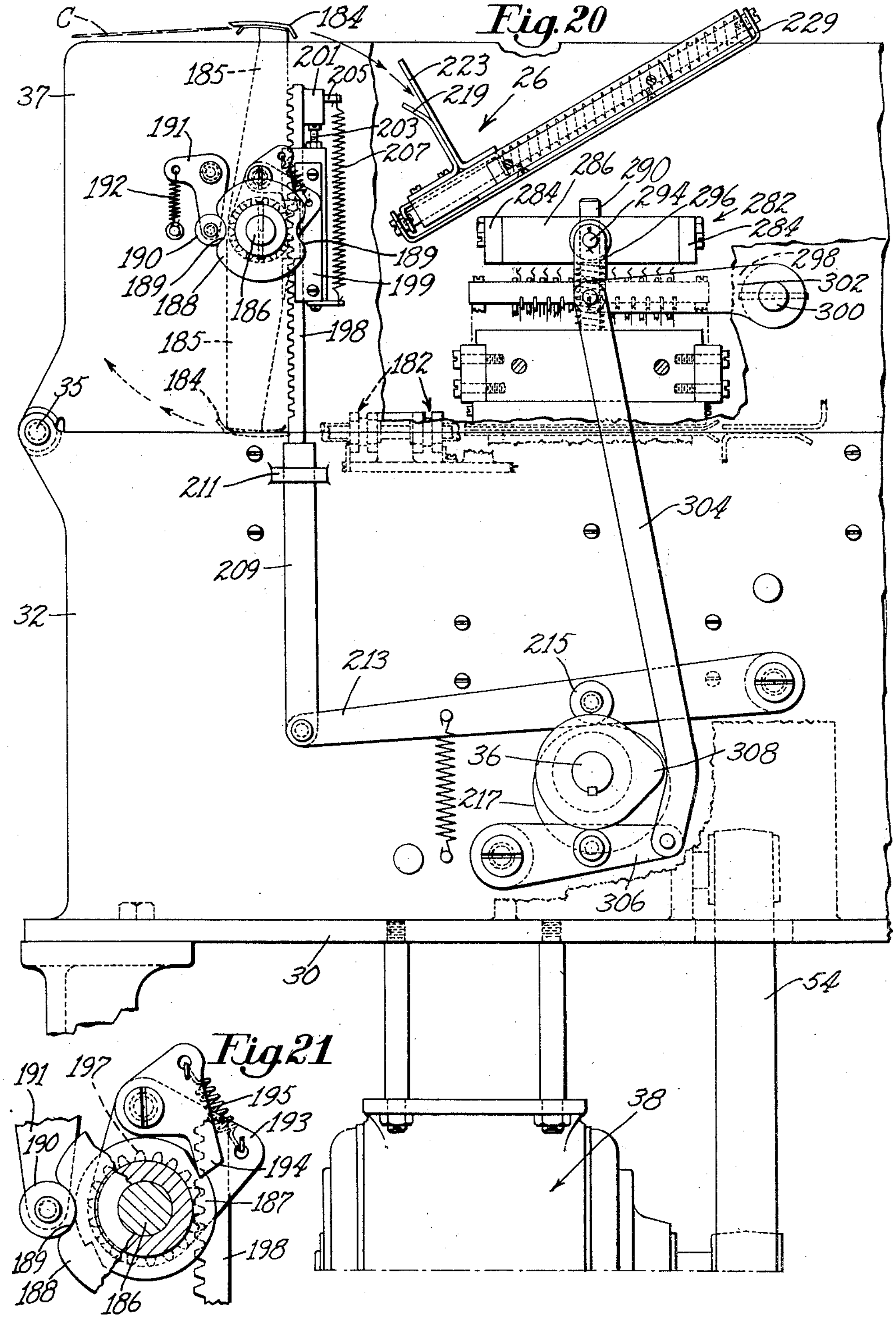
FIG. 20 is a side elevation with parts broken away to illustrate the mechanisms for operating the storage restoring unit and the stacking mechanisms.
FIG. 21 is an enlarged view of a portion of the stacker operating mechanism seen in FIG. 20.

However, according to the present embodiment, each card after being sensed is transferred by the grippers 182 to the clips 184 of the stacking unit 24 which, in turn, places each card in the receiving magazine 26 in the same order and placement as it was removed from the feed magazine. The spring clips 184 are carried at opposite ends of a pair of arms 185 (FIGS. 17 and 20) fixed to a shaft 186 journaled in the side frames 37, 39. Referring to FIGS. 20 and 21, it may be seen that the shaft 186 has fixed thereto a ratchet wheel 187 and a flange 188. The flange 188 is provided with two depressions 189, 180° apart, as is apparent on FIG. 20, the depressions being adapted to receive a roll 190 carried on one arm of a bell crank 191. The bell crank has attached thereto a spring 192 which acts to urge the roll 190 into engagement with the periphery of the flange 188. When in the position illustrated in FIG. 20, the roll 190 enters one of the depressions 189 to maintain the shaft, as well as the arms 185, in the position illustrated or with the arms moved 180° therefrom. In either of these positions, the spring clips 184 are in position to receive the leading edge of a card fed thereto by the grippers. Adjacent the ratchet wheel 187 there is mounted for rocking movements on the shaft a plate 193 having pivotally mounted thereon a pawl 194 which is urged by a spring 195 into engagement with the periphery of the ratchet wheel 187. As seen in FIG. 21, the ratchet wheel is provided with only two teeth 180° apart. Fixed to one side of the plate 193 and adapted to rock therewith is a pinion 197 which engages a vertical rack 198 guided by a bracket 199 fixed to the side frame 37. The rack is provided with a lug 201 adapted to engage a stop screw 203 when the rack is in its lowermost position as illustrated in FIG. 20. The lug 201 is also provided with a pin 205 which is connected to a spring 207 which normally urges the rack into its lowermost position. The lower end of the rack is engaged by an upstanding slide 209 which is guided for movement in a bracket 211 on the side frame and which at its lower end is connected to a cam lever 213. The cam lever is provided with a roll 215 riding on the periphery of a cam 217 on the cam shaft 36.

Figures 17, 18:
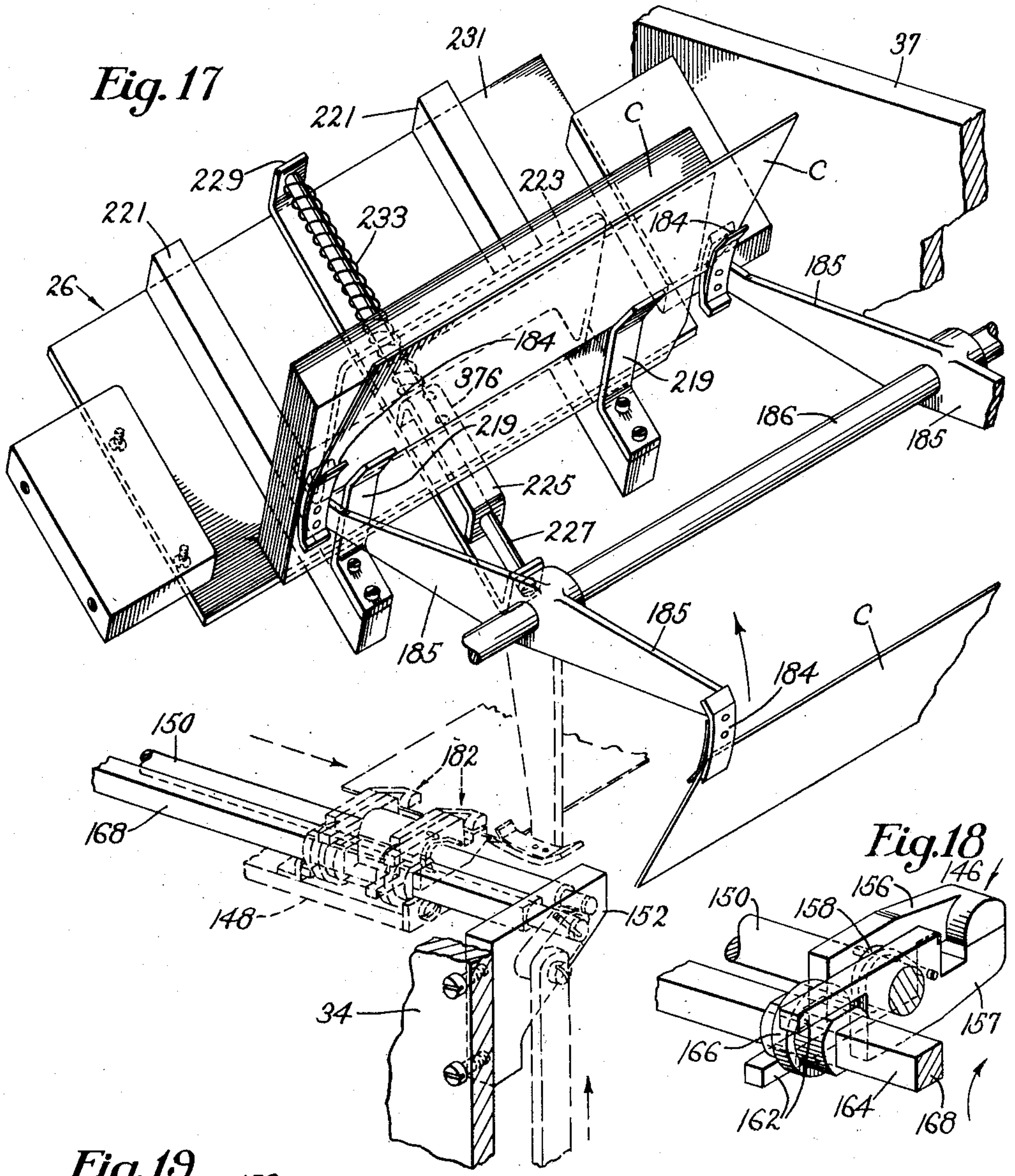
FIG. 17 is a perspective view of the record stacking unit.
FIG. 18 is a perspective view of one of the gripper units.

At the proper time in the cycle of the machine the cam 217, acting through the above mechanism, raises the rack 198 to rotate the pinion 197 and its associated plate 193 in a counterclockwise direction as seen in FIGS. 20 and 21. The flange 188, and hence also the shaft 186, is maintained in its position due to the roll 190 engaging the depression 189 in the flange, so that during the rotation of the plate 193 the pawl 194 rides out of the tooth shown in FIG. 21 on the ratchet wheel 187 and moves 180° until it engages the opposite tooth in the ratchet wheel. Later in the cycle of the machine, after the sensed card has been moved into the spring clips 184, the rack 198 is moved downwardly, rocking the pinion 197, plate 193 and pawl 194 in a clockwise direction. Due to the engagement of the pawl with a tooth on the ratchet wheel, the ratchet wheel, and hence also the shaft 186, is driven clockwise by the pawl 180°, rocking the bell crank 191 against its spring 192 which subsequently enters the other depression 189 in the flange 188. During this movement of the shaft 186 the arms 185 are moved clockwise, as seen in FIG. 20, and since the grippers 182 are open at that time, the card is carried by the clips 184 from its lower position in a circular path to the upper position shown in phantom lines in FIG. 20. During the next cycle of the machine, the arms 185 are once again moved 180° so that the card is again moved in a circular path following the direction of the arrows into the receiver 26. Referring to FIGS. 17 and 20, it may be seen that the path of movement of the card is behind a pair of upright plates 219 which are secured to rails 221, extending upwardly and to the left as seen in FIG. 17 in the path of movement of the card. The arms 185 are arranged to straddle the plates 219 and rails 221 so that as the card engages the rails it is stripped from the spring clips 184 as the arms 185 continue to move. As illustrated, the rear face of the card as it is moved into the receiver engages another upstanding plate 223 which is mounted on a bracket 225 arranged to slide along a rod 227, the rod being fixed at opposite ends in another bracket 229 mounted on a plate 231 fixed to brackets extending inwardly from the side frames. The rod 227 is provided with a spring 233 which urges the bracket 225 and hence also the plate 223 downwardly and to the right as seen in FIG. 17. As successive cards are moved into the receiver the plate 223 is moved to the right against the action of the spring 233 so that the cards as they are stacked assume an upright position as illustrated in FIG. 17.

As previously described, each card fed from the magazine is further fed by the grippers 148 in precisely oriented condition into register with the sensing unit 22. This registration, however, is exact only by reference to the edges of the card. The card to be sensed is provided with a pattern of index point positions any one or more of which may be perforated to encode information on the card. The pattern on the card normally is precisely oriented with respect to the edges of the card so that when the card is fed and registered by the above-described feed mechanism, the pattern on the card is precisely registered with an identical pattern of sensing pins in the sensing unit 22. However, as previously discussed, the punched pattern on the card may not be precisely oriented with respect to its edges with a result that the punched pattern may be out of register with the normal type of sensing means resulting in a failure to sense the punched holes in the card.

Figure 13:
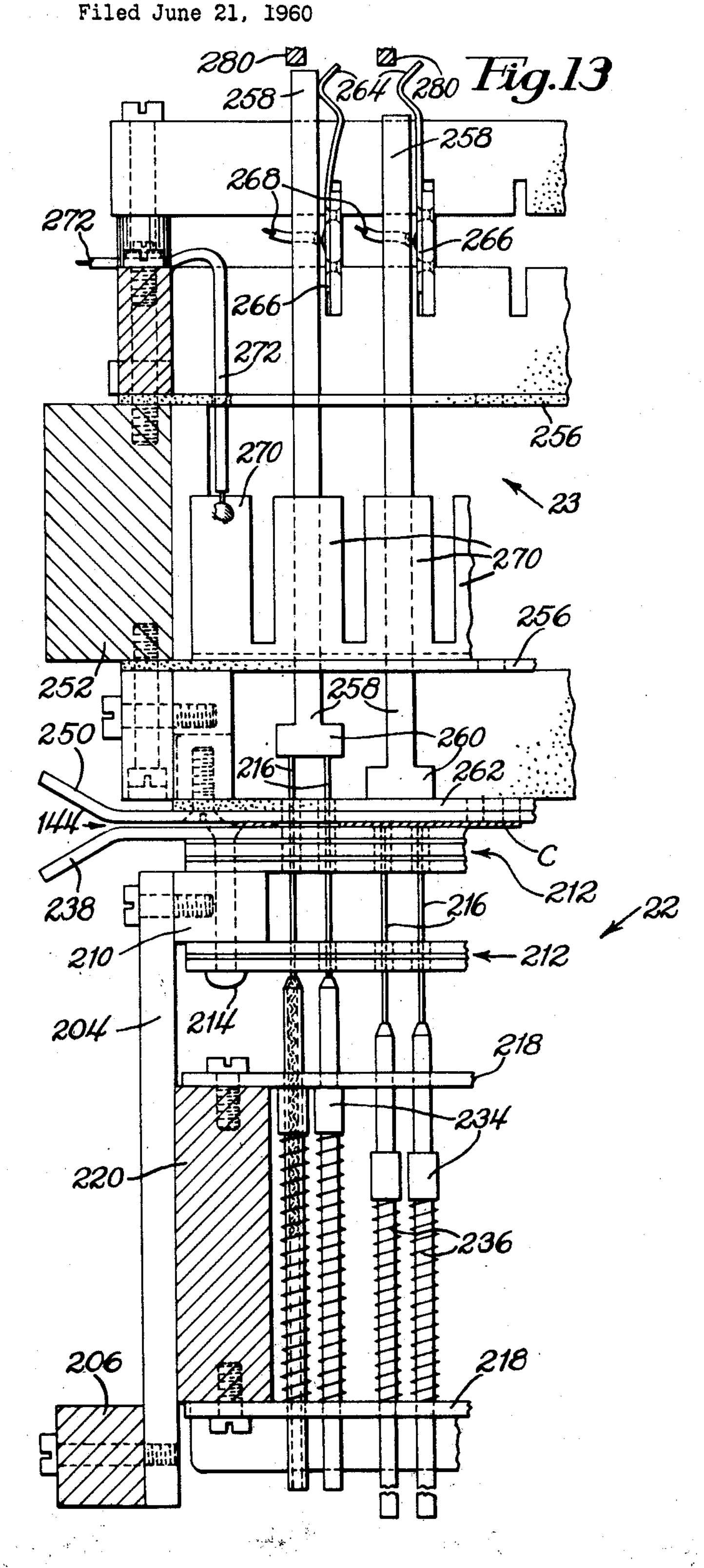
FIG. 13 is a view in side elevation of the mechanisms illustrated in FIGS. 8 through 10.
Figure 14:
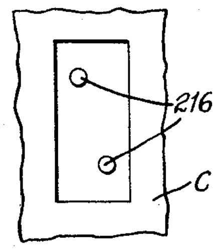
FIGS. 14, 15 and 16 are views greatly enlarged illustrating the relative positions of the sensing pins and the perforation being sensed in various positions of misalignment.
Figure 15:
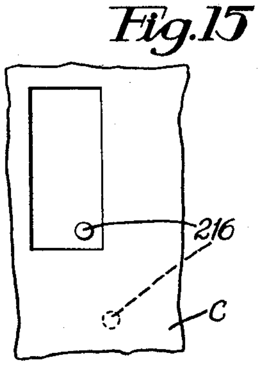
Figure 16:
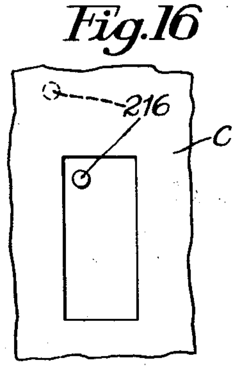

Recognizing this fact, the novel sensing unit to be described is provided with a pattern of groups of sensing pins 216 (FIGS. 10, and 13–16), the group pattern corresponding to the pattern on the card. Each group includes two pins, either one of which is individually effective to sense a perforation in the card. Referring to FIG. 14, it may be seen that the two pins in each group are so spaced as to engage the card within an area corresponding to the perforation area of a card index position. Thus with precise registration both pins are projectable through a perforation in the card. Two extreme examples of misregistration between card perforation and sensing pins are illustrated in FIGS. 15 and 16. It may be seen that even in such extreme cases at least one of the two associated pins is aligned with a portion of the perforation and is projectable therethrough for sensing in a manner presently to be described.

To the above ends the card sensing unit 22 includes a pair of vertical plates 204 (FIGS. 1 and 4) mounted at their lower ends on two crossbars 206 fixed to brackets 208 extending inwardly from the side frames 32, 34. The upper ends of the side plates 204 have fixed thereto horizontal spacer bars 210 (see also FIG. 10) which serve to mount a series of perforated guide plates 212 above and below the spacer bars 210, the guide plates being secured to the bars by rivets 214. Also secured by the rivets 214 and above the guide plates is a plate 238 having downturned ends forming the lower surface of the card chamber 144. As most clearly seen in FIG. 10, perforations in the plates 212 guide the upper ends of the sensing pins 216, the lower ends of which are received between a pair of spaced horizontal plates 218 which form a portion of a movable frame 220. The plates 218 are fixed to the upper and lower faces of a pair of bars 222 so that the bars and plates 218 form a box-like structure which slides up and down between the side plates 204. Referring to FIGS. 3 and 4, it may be seen that the crossbars 222 are fixed at their opposite ends to a pair of guide blocks 224 having vertical guideways 226 arranged to slide on keys 228 fixed to the side frames 32, 34. Each of the guide blocks 224 is provided at its lower end with a roll 230 which rides on a cam 232. As best seen in FIG. 4, there are two cams 232 fixed to the cam shaft 36 inside the side frames. When the clutch is tripped, the cam shaft 36 makes a single revolution, as above described, and during such revolution the cams 232 cause the guide blocks 224 to rise and fall, thus moving the movable frame 220 up and down during a single cycle of the machine.

Referring again to FIG. 10, it may be seen that the sensing pins 216 are provided with enlarged portions 234 arranged below the upper plate 218 with the lower ends of the sensing pins being guided in holes in the lower plate 218. Each of the pins is provided with a spring 236 which urges each pin upwardly, causing the pins to follow the up and down movement of the frame 220. Thus as the frame is moved up the sensing pins are projected through the plate 238 and into engagement with a card registered on the plate. By reference to FIGS. 3 and 10, the arrangement of the pins in groups of two may be seen. While the showing of the pins 216 in FIG. 3 is not complete, it should be obvious that there are sufficient groups of sensing pins to sense simultaneously all possible punched hole positions in a card. As stated above, the card may be substantially misaligned with the sensing pins and yet have at least one sensing pin of a pair pass through a hole at an index position. Since the sensing pins are individually mounted and yieldingly urged by an individual spring 236, one of the two sensing pins can be restrained by engaging a solid portion of the card, while the other sensing pin is free to pass through the hole. Thus, during the sensing cycle for every punched hole position on the card at least one and generally two sensing pins will be projected through each hole in the card.

Figure 9:
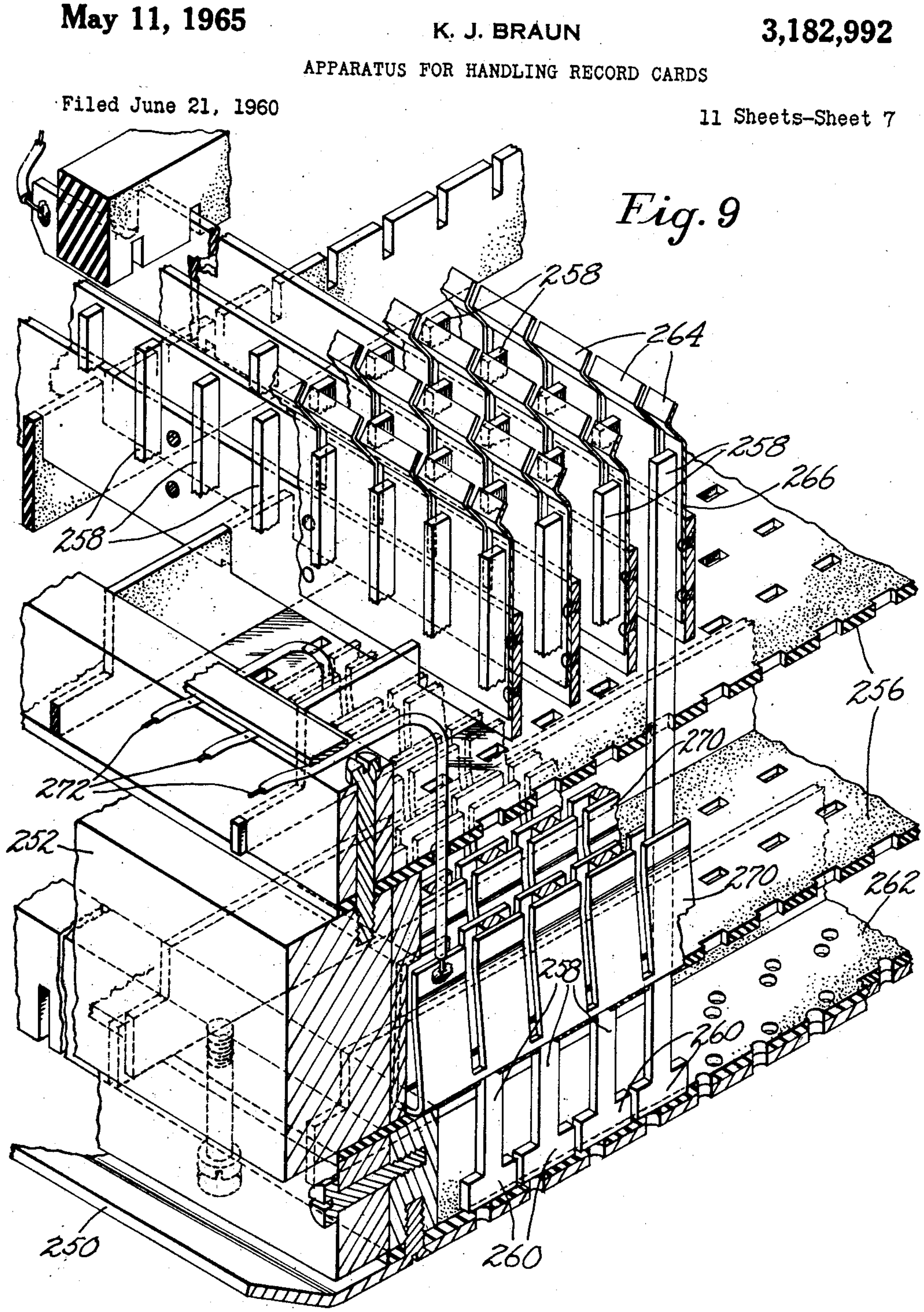
FIG. 9 is a perspective view partly in section of the information storing unit.
Figures 10, 11, 12:
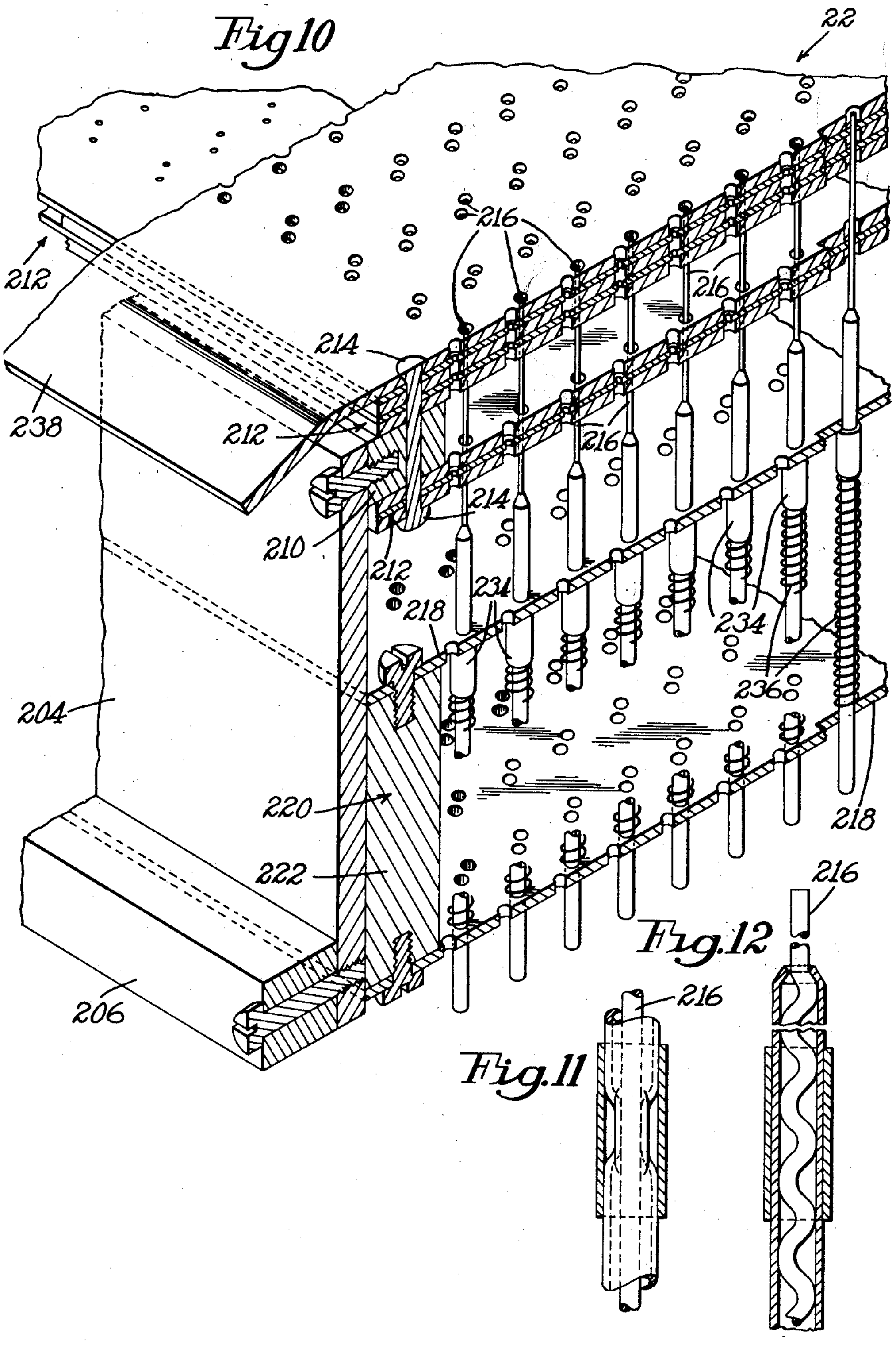
FIG. 10 is a perspective view partly in section of the record sensing unit.
FIGS. 11 and 12 are views partly in section illustrating the construction of the sensing pins.

For supporting the card against the pressure of the sensing pins the upper surface of the card chamber 144 is formed by a plate 250 (FIGS. 4, 9 and 13) having perforations corresponding to those in the plate 238 forming the lower surface of the chamber. The plate 250 is fixed on the lower side of a frame containing the storage unit 23, the frame being carried by two crossbars 252 which are fixed to blocks 254 extending inwardly from the side frames 32, 34. As best seen in FIGS. 9 and 13, the storage unit 23 includes two parallel guide plates 256 formed of insulating material and fixed above and below the crossbars 252. The plates 256 are provided with rectangular perforations which guide a plurality of electrically conductive switch pins 258 for vertical movement. The switch pins are equal in number with the number of pairs of sensing pins in the lower sensing unit there being a single switch pin arranged directly in line with each pair of sensing pins 216. The lower end of each sensing pin is provided with an enlarged portion 260 which normally rests on the upper surface of an insulating plate 262 arranged above the card chamber plate 250. The plate 262 is perforated to allow passage of any sensing pins that are projected through holes in the card. Thus, each sensing pin that is projected through a hole in the card engages the enlarged portion 260 of its associated switch pin 258, raising the pin while those switch pins that are not engaged by associated sensing pins remain in their lower position against the plate 262. The arrangement between sensed and non-sensed position is most clearly shown in FIG. 13.

It may be seen that when in its lower, non-sensed position each switch pin is spaced from an electrically conductive finger 264 while each switch pin in its upper or sensed position engages a corresponding finger displacing the finger, as seen in FIG. 13. The fingers 264 are formed on each of a plurality of comb-like conductor plates 266 which extend across the width of the storage unit 23, there being a separate comb plate 266 for each row of possible perforations extending along the length of the card, the number of rows corresponding in number to the possible code values according to one well-known type of statistical record. Each of the plates 266 is individually connected by a wire 268 for a purpose which will presently appear. The lower insulating plate 256 is provided with a plurality of electrical clips 270 which straddle the individual switch pins 258, there being an individual clip plate 270 for each vertical row or column of card holes which extends across the width of the card. Each of the clip plates is provided with an individual wire 272 so that there is an individual wire for each card column for a purpose which will presently appear.

According to the coding set up on the card under normal conditions only one hole will appear in each column across the width of the card when numbers only are recorded thereon. Thus, each column of associated switch pins 258 which extend across the width of the card are electrically connected in common by a clip plate 270, each such column corresponding to a column on the card. Thus, for any digit from 0 to 9 which is recorded by one hole in an individual column, only one switch pin 258 for that column will be raised into engagement with its associated finger 264, thus closing a circuit from the wire 272 through the clip plate 270, the raised switch pin 258, one of the comb plates 266 to an individual wire 268. According to the construction particularly illustrated in FIG. 9, it may be seen that each of the switch pins 258 is electrically isolated from all others except for common connections through associated clip plates 270. By reference to FIG. 13, it may be seen that the upper end of a raised switch pin 258 causes its associated finger 264 to yield so that once moved into its raised position, the switch pin will be held there due to the friction between the pin and its associated finger 264. Accordingly, during subsequent portions of the machine cycle the lower sensing frame 220 will be moved downwardly to retract the sensing pins 216 below the surface of the plate 238 but the raised switch pins will remain in their upper position, thus effectively storing the information that was sensed. Thus through the above-described sensing and storing mechanisms all columns of a perforated record card are sensed simultaneously with the sensed information being indicated by displacement of a plurality of switch pins. Each displaced pin establishes a particular electrical circuit which is useful to control the operation of any number of electrically controlled secondary data processing devices well known in the art. While the present embodiment is directed to an electrical output corresponding to the sensed information, it should be obvious that the displaced pins could also be utilized to control the operation of any number of mechanically controlled devices also well known in the art.

After the secondary device has utilized all of the information stored in the storage unit 23, the pins 258 that were raised are moved down out of engagement with their respective fingers 264 to clear all previously sensed information from the storage unit and to prepare the unit to receive information to be sensed from the next succeeding record card. To this end, each lengthwise row of switch pins 258 is adapted to be engaged at their upper ends by one of a plurality of bars 280 (FIGS. 8 and 13) which are fixed to a vertically movable frame 282. This frame includes a pair of parallel bars 284 (FIGS. 4 and 20) which extend substantially across the width of the machine and which are fixed in their opposite ends on blocks 286. The blocks are provided with bores 288 (FIG. 4) which are arranged to receive a pair of upright posts 290 rising from the blocks 254 fixed to the side frames 32, 34. Each post is provided with a spring 292 underlying the block 286 so that the entire frame 282 is normally urged in an upward direction. Each block 286 is connected through a pin 294 and link 296 to an arm 298 fixed on a shaft 300 journaled in the side frames, there being two arms 298 inside the frames and arranged at opposite ends of the frame 282. At its left end, as seen in FIG. 4, the shaft 300 also has fixed thereto an arm 302 which is connected by a depending link 304 to a cam lever 306 (FIG. 20). The cam lever is provided with a roll which rides on the periphery of a cam 308 fixed to the cam shaft 36 outside the frame 32. Thus, during the proper portion of the cycle of the machine, rotation of the cam 308 acts on the cam lever 306 and through the link 304, arms 302 and 298 and links 296 to move the frame 282 downwardly causing the bars 280 to move all switch pins to their lower non-sensing position against the lower insulating plate 262.

Having thus described my invention, what I claim as novel and desire to secure by Letters Patent of the United States is:

1. In apparatus for processing records having a feed magazine, a record processing unit and a receiving magazine, means for separating a single record from a stack in the magazine and for moving the record to a predetermined position where the record is oriented by its edges, a first set of grippers each including a pair of opposed jaws and reciprocating between said position and the processing unit, means for opening the jaws of said first set of grippers upon movement toward said predetermined position and for closing jaws on said oriented record during movement toward said processing unit for feeding a record in oriented condition to said processing unit, a second set of grippers each including a pair of opposed jaws and mounted for unitary corresponding movements with said first set of grippers for feeding a record from the processing unit while the first set of grippers is feeding another record to the processing unit, and a stacking mechanism including a pair of arms rotatably mounted intermediate their ends, a first pair of clips at one end of said arms located to receive a record fed by said second pair of grippers, a second pair of clips at the opposite end of said arms, means for rotating said arms to move said first pair of clips from record receiving position and said second pair of clips to record receiving position, and means operable during rotation of said arms to remove a record from a pair of said clips and deposit it in said receiving magazine.

2. In a record processing machine at least two stations at which individual records are acted upon in succession, means for feeding a record by its edges to a predetermined position where the record edges are accurately oriented with respect to said position, a first set of grippers each including an opposed pair of jaws and movable between said position and a first station having means to act on a record in portions related to its edges, said jaws of said first set of grippers being open when moved to said position and adapted to receive edge portions of the record oriented in said position, a second set of grippers each including a pair of opposed jaws and movable between the first station and a second station having further means to act on a record, said jaws of said second sets of grippers being open when moved to the first station for receiving edge portions of the record oriented in said first station, means mounting said first and second sets of grippers for unitary movements, and means for simultaneously closing said jaws of said first and second sets of grippers on the individual records oriented at said first position and at said first station respectively, and for maintaining the first and second sets of grippers closed during their movement toward the first and second stations, respectively, whereby successive records are fed in oriented condition by the first set of grippers to said first station into registration with the acting means and thereafter are fed in oriented condition by the second grippers to said second station into registration with the further acting means.

3. In a record processing machine having at least two stations at which individual records are acted upon in succession, means engaging a record by its edges for feeding the record to a predetermined position where the record edges are accurately oriented with respect to said position, a first set of grippers each including a pair of opposed jaws open for receiving edge portions of the record oriented in said position, means mounting the grippers for movement between said position and a first station having means to act on said record in portions related to its edges, means for closing said jaws of said first set of grippers on the record oriented at said position and during movement of the grippers toward said first station whereby the record is fed in oriented condition by the grippers to said station and registered with the acting means, said gripper closing means also being effective to open said grippers when the record is registered with the acting means and during the return movement of the grippers toward said position, a second set of grippers each including a pair of opposed jaws mounted for movement between the first station and a second station having second means to act on said record in portions related to its edges, said gripper closing means also acting on the second set of grippers for simultaneous opening and closing movements with the first set of grippers whereby the second set of grippers are closed on a record registered at the first station while the first set of grippers are being closed on a record oriented at said position, and means mounting the second set of grippers for unitary movement with the first set of grippers whereby individual records are fed from said position to the first station for registration with said first acting means by the first set of grippers while a record at the first station is being fed therefrom by the second set of grippers to said second station.

4. In record processing apparatus including means for feeding individual records successively and a receiving magazine; a stacking mechanism for said records comprising clip means for receiving a record; means for rotatably mounting said clip means; means for locating said clip means in a rotational position to receive the leading edge of a record being fed; means for unidirectionally rotating said clip means subsequent to receiving a record to restore said clip means to record receiving position; and means operable during rotation of said clip means to remove a record from said clip means and deposit it in said receiving magazine.

5. In record processing apparatus including means for feeding individual records successively and a receiving magazine: a stacking mechanism for said records comprising a pair of arms rotatably mounted intermediate their ends; one pair of clips at one end of said arms and another pair of clips at the other end of said arms; means for locating said arms in either of two positions wherein one or the other pair of clips is in the path of the leading edge of a record being fed to receive said record; means for rotating said arms a step of movement subsequent to a feed operation to transport a record received by one pair of clips and to bring the other pair of clips into record receiving position; and means operable during rotation of said arms to remove a record from one pair of said clips and deposit it in said receiving magazine.

References Cited by the Examiner

UNITED STATES PATENTS

| | | | |
|---|---|---|---|
| 628,829 | 7/99 | Mercer. | |
| 2,044,121 | 6/36 | Lasker | 235—61.65 |
| 2,324,438 | 7/43 | Thomas et al. | 235—61.112 |
| 2,490,346 | 12/49 | Furman | 235—61.11 |
| 2,704,186 | 3/55 | Braun | 235—61.112 |
| 2,893,732 | 7/59 | Hauck | 271—54 |

SAMUEL F. COLEMAN, *Primary Examiner.*

CORNELIUS D. ANGEL, DARYL W. COOK, *Examiners.*